Sept. 25, 1945.   E. E. CALHOUN   2,385,346
CHUCK FOR FRAZING MACHINES
Filed July 7, 1943

Carl E. Calhoun INVENTOR
BY Frank P. Wentworth
ATTORNEY.

Patented Sept. 25, 1945

2,385,346

UNITED STATES PATENT OFFICE 2,385,346

CHUCK FOR FRAZING MACHINES

Earl E. Calhoun, Shulls Mills, N. C., assignor to David P. Lavietes, Boone, N. C.

Application July 7, 1943, Serial No. 493,732

11 Claims. (Cl. 279—2)

The invention relates to chucks for frazing machines and more particularly to an improved chuck for holding a wooden block used in the manufactured of briar or other wood smokers' pipes.

It has been a common practice for many years in the fabrication of wooden articles to rough out the article by means of a special type of milling machine known as a frazing or "fraising" machine, in which the action of the milling tool is predetermined by a pattern or model and a mechanism imparting relative movement of the work block and the milling tool in accordance with the contour of said pattern or model.

In the manufacture of smokers' pipes, the frazing of a block of briar or other wood is the second step in the manufacture of smokers' pipes after a block has been roughly cut to a size and shape suitable for producing a pipe of the desired design. The shape of the block bears no resemblance to the bowl and stem of a finished pipe and much of the wood of the block must be removed by the milling tool to reduce the block to the desired contour and to dimensions permitting the finishing operations upon the rough finished pipe or stummel by suitable abrading tools.

In the manufacture of pipes from briar or other hard woods, the first manufacturing step is to bore out a portion of the wood block to form the bowl of the pipe. Usually the portion of the wood about the outer top of the bowl is turned and the top face of the bowl trued up. This is done with a single tool and is necessary to permit the engagement and proper positioning of the block by the chuck of a frazing machine.

Great difficulty has been experienced in properly holding a block in a chuck in a manner to avoid its being displaced in relation to the pattern or model by the stresses from the milling tool with a resultant wastage of time and material due to improper action of the tool. The block must be accurately positioned and located in its relation to the pattern or model and any shifting of the block by the very considerable stresses thereon from the milling tool will result in a stummel in which the stem of the pipe and the bowl will not be in proper alinement and the bore of the latter will be off center.

In a chuck as ordinarily used in frazing machines before my invention, the clutch jaws were manually actuated by a tapered stem having a screw threaded shank mounted in the jaw carrying block acting upon the jaws and provided with a wing head. With this arrangement the fingers of an operator were used for turning the screw to set or to release the jaws and the gripping action of the jaws was determined by the strength of the operator's fingers and varied with different operators and with different operations. Furthermore the point of application of pressure to the jaws by said stem was remote from the point of their bite upon the wood of the block and there was not only excessive wear on the parts ultimately resulting in lost motion tending towards slippage or shifting of the block but increased difficulty in getting a proper contact between the jaws and the block. At times a hand wrench was used to develop the necessary gripping action of the jaws. A further difficulty was the possible splitting or breakage of the wood block because of an uncontrolled pressure upon the block by the jaws, particularly if, as a result of frazing, a thin wall for the bowl is formed.

With chucks of the type heretofore used, an operator not only was required to stand at all times while operating the machine but was in almost constant movement between the actuating member of the pattern or model carrier and the chuck, since the actual time interval required in frazing a pipe bowl and stem is very short. The mounting and discharge intervals with chucks as immediately above referred to, requires a considerable proportion of the time required for the frazing operations.

With the above conditions in mind, I have produced a chuck for a frazing machine which is so constructed as to permit the rapid and accurate mounting of a wooden block, and a rapid discharge of the completed stummel therefrom. In the chuck of my invention a uniform predetermined pressure by the gripper jaws is developed with operation of the machine upon succeeding blocks. The chuck not only may be adjusted to adapt it to pipes having bowls of different diameters but to nicely regulate the gripper movement to ensure the development of pressure by the jaws sufficient to prevent any possible looseness of the block resulting in its shifting in relation to the jaws.

The construction is such as to apply the pressure for setting the jaws, which are of the expanding type, by means of a wedge acting closely adjacent that portion of the jaws which take a bite upon the material of the block, thus not only avoiding any spring in the material of the jaws but relieving the pivots for said jaws from undue strains and wear. If any wear should occur upon either the jaws or the actuating wedge, this may be taken up by adjustment of the wedge in relation to the jaws.

Actuation of the jaws is by means of a short lever, the power of which is compounded not only by the wedge but by that of an intermediate mechanism.

Locating the wedge adjacent and beyond the ends of the jaws facilitates the centering of the bore of the bowl in relation to the jaws and the truing up of the block in relation to the jaw head, and permits the wedge to act as an ejector pin when releasing the jaws by movement of the actuating lever.

A spring acts upon the jaw actuating mechanisms to facilitate the lever action in releasing the jaws and to prevent accidental movement of the jaws before a block is mounted in the chuck.

The wedge pin is so formed as to prevent accidental movement of the jaws when the wedge is disengaged therefrom.

The operator of a frazing machine having a chuck embodying the invention, after the machine has been adjusted to produce stummels for a pipe of a particular design, need not move from end to end of the machine and is relieved from leg and finger strains resulting from the operation of the type of frazing machines commonly in use prior to my invention.

The invention consists primarily in a chuck for use in a frazing machine of a type having a milling tool, a movable frame capable of lineal and rotary movement in relation to said tool, a pattern shaft rotatably mounted in said frame and a guide adapted to cooperate with a pattern on said shaft and control movements of said frame in accordance with said pattern, said chuck embodying therein a frame, a base supported thereby, a plurality of jaws pivotally mounted in and projecting from said base, a pin passing through said base and between said jaws having a wedge shaped head extending beyond the free ends of said jaws whereby with movement of said head towards and within said jaws, outward pressure is developed adjacent the free ends of said jaws, lever actuated means for imparting axial movement to said pin to move said head towards said jaws, and means acting independently of said lever actuated means for imparting a reverse movement to said pin to contract said jaws and eject work therefrom; and in such other novel features of construction and combination of parts as are hereinafter set forth and described and more particularly point out in the claims hereto appended.

Referring to the drawing.

Like numerals refer to like parts throughout the several views.

Figure 1:
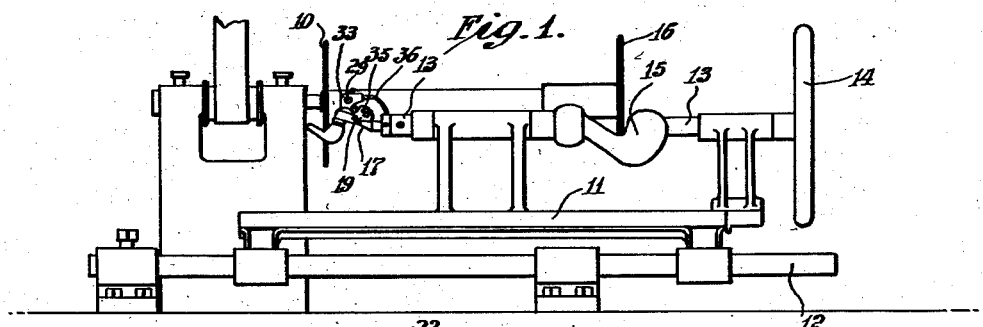
Fig. 1 is a front view, shown more or less conventionally, of a frazing machine supplied with a chuck embodying my invention.
Figure 2:
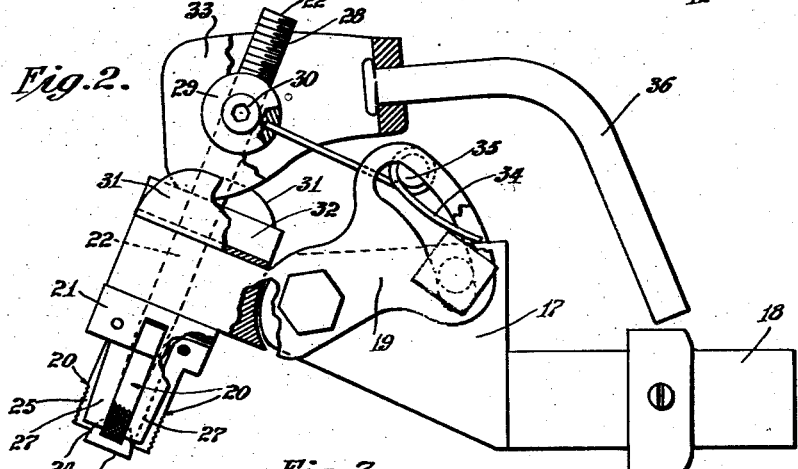
Fig. 2 is a side view, partly broken away, of a chuck removed from the machine.
Figure 3:
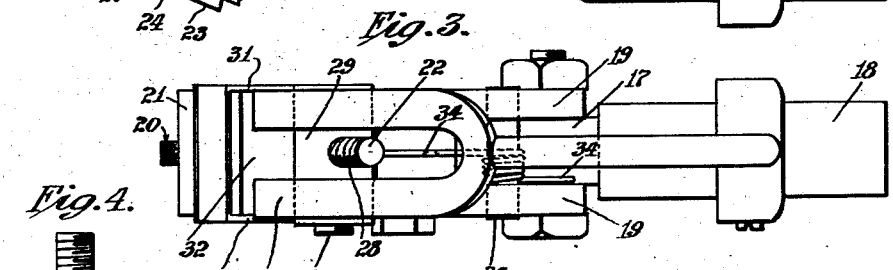
Fig. 3 is a plan view of Fig. 2.

In the accompanying drawing, I have illustrated a chuck embodying my invention as applied to a type of frazing machine well known in the pipe manufacturing industry. This machine has a milling tool 10 and a pattern frame 11 slidably and pivotally mounted on a guide bar 12 so as to be capable of simultaneous lineal and oscillatory movement in relation to said tool. Mounted in said frame 11 is a shaft 13 rotatable by means of a hand wheel 14. In the length of this shaft is a pattern or model 15 adapted for engagement with a fixed guide or reaction member 16 which permits movement of the pattern or model carrying frame toward and from the milling tool only in accordance with the said pattern or model. The machine may be adjusted in various respects to adapt it for use with different patterns or models. This is immaterial to the present invention.

One end of the shaft 13 has an axial socket by means of which a chuck is mounted upon said shaft so as to be movable therewith.

Referring more particularly to a chuck embodying my invention, it consists of a block 17 having a stem 18 by which it is rigidly mounted on the shaft 13. Adjustably mounted on said block, is a frame 19 supporting a base carrying the gripper jaws 20. Said jaws are pivoted adjacent one end thereof in a base 21 having a finished, plane face about the jaws.

Passing through a space within the jaws 20, is a round pin 22 having an enlarged circular head 23 positioned beyond the ends of the jaws. The edge of this head is bevelled inwardly towards the axis of the jaw structure as shown at 24 so that with movement of the head 23 towards and within the ends of the jaws a strong wedging action occurs causing expansion of the jaw structure.

The pin 22 is tapered towards the head 23 for a distance approximating the length of the jaws affording a portion at the end of said tapered portion adjacent the heels of the jaws of dimensions so that with movement of the pin to move its head away from the jaws, engagement of this portion with said heels will contract the jaw structure.

Figures 4, 5, 6:
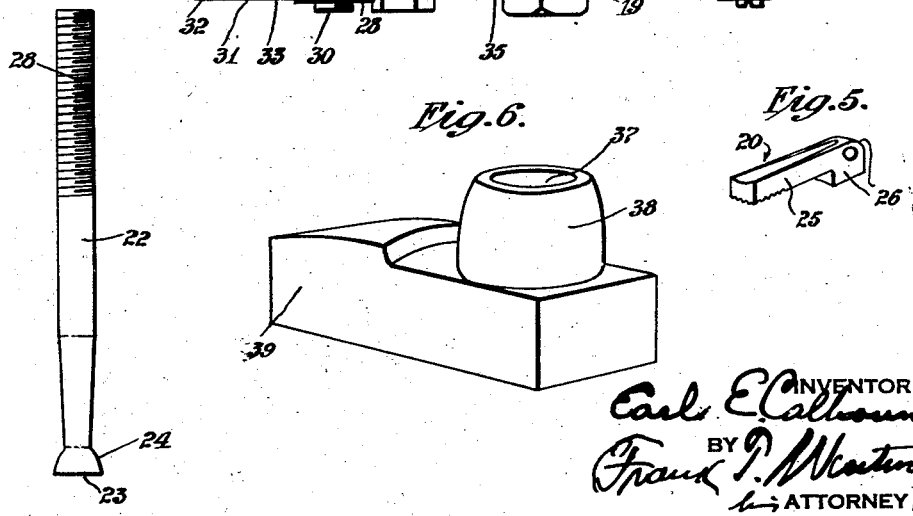
Fig. 4 is a view of the wedge pin.
Fig. 5 is a perspective view of one of the gripper jaws.
Fig. 6 is a perspective view of a wooden block prepared for frazing.

As illustrated in Fig. 5, each jaw comprises a gripper arm 25 and a heel 26 adjacent which the jaw is pivoted upon the base 21. This base also carries a plurality of fixed separators 27. The inner wall of each arm 25 is concavely curved to afford clearance for the wedge pin 22. The inner faces of the heels are spaced apart sufficiently to permit free oscillation of the jaws when the tapered portion of the pin 22 is adjacent said heels, but cause engagement of said heels with the portion of said pin adjacent an end of said tapered portion. The outer face of each arm 25 adjacent its free end may be roughened to increase the bite of the jaw upon the wooden block.

The end of the pin 22 remote from the head 23 is exteriorly screw threaded as at 28 and this end portion passes through a hole in the base 21 and the frame 19 and is adjustably mounted by means of screw threads in a bearing stud 29. A set screw 30 is used to lock the pin 22 in any adjusted position. Intermediate the stud 29 and the frame 19 is a channelled fitting 31 carrying a replaceable, slightly compressible pad 32 against which an actuating cam for imparting axial movement to the pin 22 bears.

A bifurcated actuating cam frame 33 has its arms mounted upon opposite ends of the stud 29. It will be noted that except for the bearing pad 32, the actuating mechanism for the wedge pin, is carried in its entirety by said pin and is unconnected with other parts of the chuck excepting therethrough. As will hereinafter appear, this construction permits regulation of the jaw action to adapt the chuck to bowl bores of different diameters, and also to control the pressure exerted upon said jaws by the powerful actuating mechanism for the jaws acting through the wedge pin head 23.

Acting upon the pin 22 through the stud 29 is a helical spring 34 the coil of which is positioned upon a pin 35 carried by the frame 19, one projecting end of this spring bearing upon the stud 29 and the other projecting end, upon the block 17.

The actuating cam frame 33 has a lever handle 36 so formed as to have its movement when setting the jaws stopped by engagement with some part of the machine adjacent the end of the shaft 13. The cam frame may have flattened portions upon opposite ends of each cam surface thereon to ensure locking of the frame immediately following disengagement of said cam surfaces from the seat 32.

The wooden block for forming the stummel is shown in Fig. 6, the bore of the bowl being located at 37 and the finished outer surface about the top of the bowl at 38. The portion of the block from which the pipe stem is formed is shown at 39.

The operation of a frazing machine fitted with a chuck embodying the invention, is substantially as follows:

In the drawing, the chuck is shown in connection with an old and well known type of frazing machine, the showing of which is largely conventional as it forms no part of the present invention but has a mode of operation essential to any frazing machine with which the invention may be used.

During operation of the machine, the operator instead of standing adjacent the hand wheel 14 and moving from this position to adjacent the chuck in mounting and discharging the work, may be seated upon a stool with said wheel within convenient reach of his right hand and the chuck and containers for the wooden blocks and the finished stummels within convenient reach of his left hand.

After the frazing machine and the chuck have been properly adjusted, the operator merely moves the lever 36 away from the stem 18, thus turning the cam frame 33 about the stud 29. This movement of the cam frame imparts lineal movement to the pin 22 to an extent to disengage its head 23 from the free ends of the jaws 20 and engages the portion of the pin adjacent the large end of the taper of said pin with the heels of the several jaws. This movement of the pin which is by action of the spring 34 upon the stud 29, closes or contracts the jaws. The taper of the pin 22 is of a length to ensure a proper timing in the action of the tapered portion of said pin and of the head 23.

The bore of the part 36 of the wooden block is then slipped over the closed or contracted jaws until its faced top abuts against and is flush with the plane face of the base 21. Whatever the adjustment of the chuck may be, the block always has a free sliding movement in relation to the jaws.

While mounting the wooden block upon the jaws as described, it is properly positioned in relation to the portion of the pattern or model 15 controlling movement of the frame 13 during the frazing operation.

The operator, using his right hand, then moves the lever 36 towards the stem 18 until further movement thereof is positively stopped. This movement of the lever turns the cam frame about the stud 29, the cam surfaces on said frame imparting lineal movement to the pin 22 through the movement of said stud. By using a slightly compressible or resilient seat 32, slight flexibility in the action of the lever in relation to the jaws is permissible thus compensating for any minute inaccuracy in adjusting the chuck, and preventing the development of excessive pressure of its jaws 20 against the wall of the bowl. This movement of the cam frame tensions the spring 34.

This movement of the pin 22 by the cam frame 33 is a short, powerful one and amounts to merely a fraction of an inch. During this movement, the head 23 of the pin approaches and engages the ends of the several jaws 20, the bevelled edge of said head camming the jaws outwardly into the expanded or open position and into engagement with the inner wall of the pipe bowl. Prior to or during this movement of the jaws, the tapered portion of the pin 22 is so moved as to provide clearance adjacent the heels 26 of the several jaws to permit such jaw movement.

The operator may use the palm of his right hand in actuating the lever 36 to expand the jaws.

The jaws having been expanded or engaged within the block in the manner described, the frazing machine is operated to form the stummel in the usual manner. The operator may remain seated during the mounting, frazing and discharge operations.

Following the completion of the frazing operation, the operator merely moves the lever 36 away from the stem 18 contracting or closing the jaws so as to disengage them from the bowl and permit it to be discharged from the chuck. During this operation, the pin 22 acts as an ejector, the operator being required merely to catch the discharged stummel in his left hand and toss it into a conveniently positioned container.

The bowls of pipes of different designs may have bores of different diameters, and since any slippage or shifting of the block in relation to the chuck jaws will result in spoilage and wastage, means for adjusting the gripping action of the chuck jaws is provided to adapt the chuck for use in the production of a wide range of variation in the diameters of the bores in pipes, as well as to control the pressure of the jaws against the wall of the bowl at all times.

If the extent of expansion of the jaws is so great as to require excessive pressure upon the lever 36 and the power compounding mechanism actuated thereby to expand or set the jaws, said power compounding mechanism consisting of the cam frame 33 and the cam edge of the head 23 of the pin 22, or to prevent a full movement of the lever 36 to its stop position, it is merely necessary to release the lock screw 30, and turn the pin 22 in the stud 29 in a direction to move the head 23 outwardly of the free ends of the jaws 20 so as to limit its camming action on said jaws. If on the contrary, the jaws are not expanded to an extent to engage the inner wall of the bowl with sufficient pressure to firmly hold the wooden block, after the screw 30 has been released, the pin 22 is so turned as to advance the head 23 towards the free ends of the jaws thus increasing its camming action to impart greater expansion of the jaws.

Since there is great vibration about a frazing machine, the set screw 30 must be set hard against the pin 22 following each adjustment, the screw threads upon the pin 22 aiding in securing the desired tightness of the set of said screw.

In adjusting the chuck to control pressure by the jaws, a jaw movement of only a thousandth of an inch or so may be required, although when adjusting to size variation of different bowls, a much greater movement of the jaws may be necessary.

Whatever the adjustment may be, the lever 36 should always have the same quantity of movement and require the same exertion by the operator in expanding or contracting the jaws, thus ensuring uniform operating conditions at all times.

The use of a round tapered pin 22 having a circular head 23 permits great nicety in the regulation of the jaw action irrespective of the amount of turning movement of the pin 22 during adjustment.

The saving of time in mounting a block and discharging a completed stummel by avoiding movement of the operator about the machine, and the conservation of the energy of the operator, materially increases the output capacity of a frazing machine having a chuck embodying the invention, as compared with the operation of such a machine having the form of chuck commonly used prior to the invention.

It is not my intention to limit the invention to the precise details of construction shown in the drawing, it being apparent that such are capable of wide variation without departing from the spirit and scope of the invention.

Having described the invention, what I claim as new and desire to have protected by Letters Patent is:

1. A chuck for use in frazing machines of a type having a milling tool, a frame capable of lineal and oscillatory movement in relation to said tool, a pattern shaft rotatably mounted in said frame and a guide adapted to cooperate with a pattern on said shaft to control movements of said frame in accordance with said pattern, embodying therein a frame adapted to be mounted on said pattern shaft, a base supported thereby, a plurality of jaws pivotally mounted on and projecting from said base, a pin passing through said base and between said jaws having a wedge shaped head extending beyond the free ends of said jaws whereby with movement of said head towards and within said jaws outward pressure is developed adjacent the free ends of said jaws, a lever actuated means for imparting axial movement to said pin to move said head towards said jaws, and means acting independently of said lever actuating means for imparting a reverse movement to said pin to contract said jaws with movement of said head outwardly thereof and eject work from the chuck.

2. A chuck for use in frazing machines of a type having a milling tool, a frame capable of lineal and oscillatory movement in relation to said tool, a pattern shaft rotatably mounted in said frame and a guide adapted to cooperate with a pattern on said shaft to control movements of said frame in accordance with said pattern, embodying therein a frame adapted to be mounted on said pattern shaft, a base supported thereby, a plurality of jaws pivotally mounted on and projecting from said base, a pin passing through said base and between said jaws having a wedge shaped head extending beyond the free ends of said jaws, whereby with movement of said head towards and within said jaws outward pressure is developed adjacent the free ends of said jaws, a stud, connections between said pin and said stud, a cam frame pivotally mounted on said stud, a bearing engageable by the cam surface on said cam frame, an actuating lever on said cam frame to move said head towards and within said jaws, and means acting independently of said actuating lever for imparting a reverse movement to said pin to contract said jaws with movement of said head outwardly thereof and eject work from the chuck.

3. A chuck for use in frazing machines of a type having a milling tool, a frame capable of lineal and oscillatory movement in relation to said tool, a pattern shaft rotatably mounted in said frame and a guide adapted to cooperate with a pattern on said shaft to control movements of said frame in accordance with said pattern, embodying therein a frame adapted to be mounted on said pattern shaft, a base supported thereby, a plurality of jaws pivotally mounted on and projecting from said base, a pin passing through said base and between said jaws having a wedge shaped head extending beyond the free ends of said jaws whereby with movement of said head towards and within said jaws outward pressure is developed adjacent the free ends of said jaws, each of said jaws having a heel adjacent its point of pivotal support and said pin being tapered towards said head and having a portion adjacent the heels of said jaws, of larger dimensions than said tapered portion, lever actuated means for imparting axial movement to said pin towards said jaws and means acting independently of said lever actuating means for imparting a reverse movement to said head outwardly thereof and eject work from the chuck.

4. A chuck for use in frazing machines of a type having a milling tool, a frame capable of lineal and oscillatory movement in relation to said tool, a pattern shaft rotatably mounted in said frame and a guide adapted to cooperate with a pattern on said shaft to control movements of said frame in accordance with said pattern, embodying therein a frame adapted to be mounted on said pattern shaft, a base supported thereby, a plurality of jaws pivotally mounted on and projecting from said base, a pin passing through said base and between said jaws having a wedge shaped head extending beyond the free ends of the jaws whereby with movement of said head towards and within said jaws outward pressure is applied adjacent the free ends of said jaws, lever actuated means for imparting axial movement to said pin to move said head towards said jaws and a spring acting upon said pin independently of lever actuated means biased to move the head of said pin away from said jaws to contract said jaws and eject work from the chuck.

5. A chuck for use in frazing machines of a type having a milling tool, a frame capable of lineal and oscillatory movement in relation to said tool, a pattern shaft rotatably mounted in said frame and a guide adapted to cooperate with a pattern on said shaft to control movements of said frame in accordance with said pattern, embodying therein a frame adapted to be mounted on said pattern shaft, a base supported thereby, a plurality of jaws pivotally mounted on and projecting from said base, a pin passing through said base and between said jaws having a wedge shaped head extending beyond the free ends of said jaws whereby with movement of said head towards and within said jaws outward pressure is applied adjacent the free ends of said jaws, means whereby said pin may be axially adjusted to vary the position of said head in relation to and the movement of said jaws to control the pressure exerted thereby and to adapt the chuck for use with openings having different diameters, lever actuated means for imparting movement to said pin and means acting independently of said lever actuating means for imparting a reverse movement to said pin to contract said jaws with movement of said head outwardly and eject work from the chuck.

6. A chuck for use in frazing machines of a type having a milling tool, a frame capable of lineal and oscillatory movement in relation to said tool, a pattern shaft rotatably mounted in said frame and a guide adapted to cooperate with a pattern on said shaft to control movements of said frame in accordance with said pattern, embodying therein a frame adapted to be mounted on said pattern shaft, a base supported thereby, a plurality of jaws pivotally mounted on and projecting from said base, a round pin passing through said base and between said jaws and having a circular head, the edge of which is bevelled towards the axis of said pin and extends beyond the free ends of said jaws whereby with movement of said head towards and within said jaws outward pressure is applied adjacent the free ends of said jaws, means whereby said pin may be axially adjusted to vary the position of said head in relation to and the movement of said jaws to control the pressure exerted thereby and to adapt the chuck for use with openings having different diameters, lever actuated means for imparting movement to the said pin and means acting independently of said lever actuating means for imparting a reverse movement to said pin to contract said jaws with movement of said head outwardly and eject work from the chuck.

7. A chuck for use in frazing machines of a type having a milling tool, a frame capable of lineal and oscillatory movement in relation to said tool, a pattern shaft rotatably mounted in said frame and a guide adapted to cooperate with a pattern on said shaft to control movements of said frame in accordance with said pattern, embodying therein a frame adapted to be mounted on said pattern shaft, a base supported thereby, a plurality of jaws pivotally mounted on and projecting from said base, a pin passing through said base and between said jaws having a wedge shaped head extending beyond the free ends of said jaws whereby with movement of said head towards and within said jaws outward pressure is developed adjacent the free ends of said jaws, each of said jaws having a heel adjacent its point of pivotal support and said pin being tapered towards said head with a portion adjacent the heels of said jaws of larger dimensions than said tapered portion, means whereby said pin may be axially adjusted to vary the position of said head in relation to and the movement of said jaws to control the pressure exerted thereby and to adapt the chuck for use with openings having different diameters, lever actuated means for imparting movement to said pin towards said jaws, and means acting independently of said lever actuating means for imparting a reverse movement to said head to contract said jaws with movement of said head outwardly, and eject work from the chuck.

8. A chuck for use in frazing machines of a type having a milling tool, a frame capable of lineal and oscillatory movement in relation to said tool, a pattern shaft rotatably mounted in said frame and a guide adapted to cooperate with a pattern on said shaft to control movements of said frame in accordance with said pattern, embodying therein a frame adapted to be mounted on said pattern shaft, a base supported thereby, a plurality of jaws pivotally mounted on and projecting from said base, a pin passing through said base and between said jaws having a wedge shaped head extending beyond the free ends of said jaws, a stud, connections between said pin and said stud, means whereby said pin may be axially adjusted in said stud to vary the movement of said jaws to control the pressure exerted thereby and to adapt the chuck for use with openings having different diameters, and lever actuated means for imparting movement to said pin.

9. A chuck for use in frazing machines of a type having a milling tool, a frame capable of lineal and oscillatory movement in relation to said tool, a pattern shaft rotatably mounted in said frame and a guide adapted to cooperate with a pattern on said shaft to control movements of said frame in accordance with said pattern, embodying therein a frame adapted to be mounted on said pattern shaft, a base supported thereby, a plurality of jaws pivotally mounted on and projecting from said base, a round pin passing through said base and between said jaws and having a circular head, the edge of which is bevelled towards the axis of said pin and extends beyond the free ends of said jaws whereby pressure is applied adjacent the free ends of said jaws, each of said jaws having a heel adjacent its point of pivotal support, said pin being tapered towards said head and having a portion adjacent the heels of said jaws of larger dimensions than said tapered portion and exterior screw threads adjacent its end opposite said head, a stud having a screw threaded opening therein by which said pin is rotatably connected with said stud, means locking said pin in relation to said stud, a cam frame pivotally mounted on said stud, a bearing cooperating with said cam frame and an actuating lever on said cam frame.

10. A chuck for use in frazing machines of a type having a milling tool, a frame capable of lineal and oscillatory movement in relation to said tool, a pattern shaft rotatably mounted in said frame and a guide adapted to cooperate with a pattern on said shaft to control movements of said frame in accordance with said pattern, embodying therein a frame adapted to be mounted on said pattern shaft, a base supported thereby, a plurality of jaws pivotally mounted on and projecting from said base, a round pin passing through said base and between said jaws and having a circular head, the edge of which is bevelled towards the axis of said pin and extends beyond the free ends of said jaws whereby pressure is applied adjacent the free ends of said jaws, each of said jaws having a heel adjacent its point of pivotal support, said pin being tapered towards said head and having a portion adjacent the heels of said jaws of larger dimensions than said tapered portion and exterior screw threads adjacent its end opposite said head, a stud having a screw threaded opening therein by which said pin is rotatably connected with said stud, means locking said pin in relation to said stud, a cam frame pivotally mounted on said stud, a bearing cooperating with said cam frame, an actuating lever on said frame and a spring acting upon said stud and biased to move the head away from said jaws.

11. A chuck for use in frazing machines of a type having a milling tool, a frame capable of lineal and oscillatory movement in relation to said tool, a pattern shaft rotatably mounted in said frame and a guide adapted to cooperate with a pattern on said shaft to control movements of said frame in accordance with said pattern, embodying therein a frame adapted to be mounted on said pattern shaft, a base supported thereby, a plurality of jaws pivotally mounted on and projecting from said base, a round pin passing through said base and between said jaws and having a circular head, the edge of which is bevelled towards the axis of said pin and extends beyond the free ends of said jaws whereby pressure is applied adjacent the free ends of said jaws, each of said jaws having a heel adjacent its point of pivotal support, said pin being tapered towards said head and having a portion adjacent the heels of said jaws of larger dimensions than said tapered portion and exterior screw threads adjacent its end opposite said head, a stud having a screw threaded opening therein by which said pin is rotatably connected with said stud, means locking said pin in relation to said stud, a cam frame pivotally mounted on said stud, a slightly compressible bearing cooperating with said cam frame and an actuating lever on said cam frame.

EARL E. CALHOUN.